United States Patent
Walfridsson

(10) Patent No.: US 6,171,481 B1
(45) Date of Patent: Jan. 9, 2001

(54) WATER PURIFIER

(75) Inventor: Stefan Walfridsson, Jönköping (SE)

(73) Assignee: Aktiebolaget Electrolux, Stockholm (SE)

( * ) Notice: Under 35 U.S.C. 154(b), the term of this patent shall be extended for 0 days.

(21) Appl. No.: 09/269,429

(22) PCT Filed: Sep. 19, 1997

(86) PCT No.: PCT/SE97/01586

§ 371 Date: Mar. 26, 1999

§ 102(e) Date: Mar. 26, 1999

(87) PCT Pub. No.: WO98/14264

PCT Pub. Date: Apr. 9, 1998

(30) Foreign Application Priority Data

Oct. 1, 1996 (SE) .................................................. 9603593

(51) Int. Cl.⁷ ............................ B01D 24/38; B01D 29/88
(52) U.S. Cl. ........................ 210/117; 210/136; 210/416.3
(58) Field of Search .................................. 210/117, 136, 210/416.3

(56) References Cited

U.S. PATENT DOCUMENTS 3,698,688 * 10/1972 Kutz .
4,298,029 * 11/1981 Zahid ..................................... 138/30
5,351,337 * 9/1994 Deutsch .
5,401,395 * 3/1995 Hagqvist et al. .................... 210/106
5,709,546 * 1/1998 Waggoner .............................. 433/82

FOREIGN PATENT DOCUMENTS 1 293 597   10/1972 (GB) .

* cited by examiner

Primary Examiner—Chester T. Barry
(74) Attorney, Agent, or Firm—Pearne & Gordon LLP

(57) ABSTRACT

A water purifier (10) comprising an inlet conduit (12) with a high-pressure pump (18), a purifying unit (22) of the type including a filter or a membrane, an outlet conduit (28) for purified water, a sensor provided in said outlet conduit (28) for the control of the high-pressure pump (18), a tap point (38) at which the outlet conduit (28) opens, a non-return valve (32) provided in the outlet conduit (28), and a reject conduit (42) for concentrated, unpurified water. In the outlet conduit (28) for purified water, between the non-return valve (32) and the tap point (38), there is provided a pressure equalizing valve (34). The object of said pressure equalizing valve (34) is to compensate for the pressure drop that can occur in the conduit (28) for purified water in case of minor leakage.

4 Claims, 3 Drawing Sheets

WATER PURIFIER

The present invention relates to a water purifier comprising an inlet conduit with a high-pressure pump, a purifier unit of the type comprising a filter or a membrane, an outlet conduit for purified water, a sensor provided in said outlet conduit for the control of the high-pressure pump, a tapping point at which the outlet conduit opens, a non-return valve disposed in said outlet conduit, and a reject conduit for concentrated unpurified water. The invention also refers to a pressure equalizing valve provided to be included in said water purifier.

In pressurized water purifiers of the kind referred to a pressure is building up in the conduit for purified water when tapping of purified water is interrupted and the pump is inactivated when a predetermined pressure has been reached. It is of extreme importance that said pressure be maintained because when the pressure in the conduit for purified water is lowered under a certain predetermined level the water purifier pump will start causing water to be supplied via the inlet conduit until a sufficient pressure has again been built up in the conduit for purified water. This type of false start can be felt very much annoying. As, in principle, it is impossible to get all valves, taps and joints to be completely tight in water purifiers of the kind referred to leakage cannot be completely avoided. Besides, water purifiers of the kind discussed are often provided with hard conduits so that the system cannot accumulate sufficient water to compensate for the pressure drop. The system is too rigid. Due to the rigid system only a couple of leaking drops are sufficient for the pressure to drop considerably, i.e. below the predetermined value at which the pump starts.

The object of the present invention is to compensate for the pressure drop that can occur in the conduit for purified water in case of a few leaking drops, i.e. the pressure in the conduit for purified water is to be maintained, for a long period of time, at a level above the predetermined pressure level at which the pump is caused to start. Such compensation is achieved by a water purifier and a pressure equalizing valve, respectively, as defined in the following claims.

An embodiment of the invention will be described below with reference to the enclosed drawings, in which.

Figure 1:
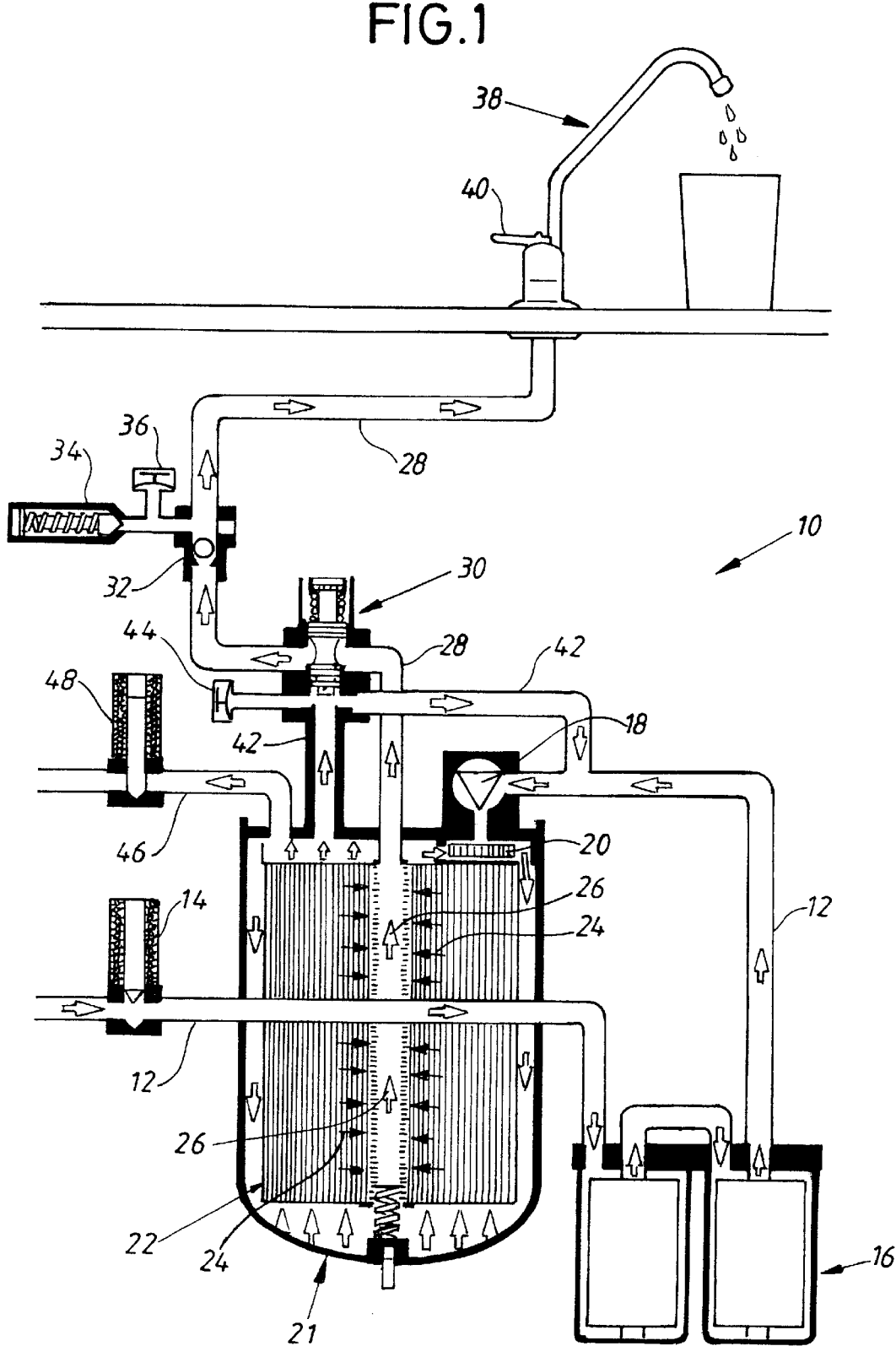
FIG. 1 shows a schematic sketch of a water purifier of the kind referred to provided with a pressure equalizing valve according to the invention.

The water purifier 10 shown in FIG. 1 comprises an inlet conduit 12 on which is mounted a first solenoid valve 14 which opens upon start of a high pressure pump 18 provided in the inlet conduit 12. Normally, the inlet conduit is connected to the water mains which means that during operation of the water purifier 10 the same pressure prevails in the inlet conduit 12 as in the water mains. In the inlet conduit 12 a pre-filter 16 is provided which in the embodiment shown consists of two communicating filter vessels.

The inlet conduit 12 opens into the high-pressure pump 18 which conveys the water in the inlet conduit 12 to a circulation pump 20 circulating said water in a pressure vessel 21 which in turn includes a filter unit 22. Suitably, the high-pressure pump 18 is a displacement pump, e.g. a sliding vane pump, which can produce a flow mainly proportional to the rotational speed. Suitably, the circulation pump 20 is a centrifugal pump, e.g. a side channel pump which can generate a very high flow, much exceeding the flow that can be generated by the high-pressure pump 18.

Of the water circulated by the circulation pump 20 in the pressure vessel 21 only a minor portion is filtered through the filter unit 22, which is indicated by arrows 24 and 26. This purified water, the permeate, is discharged from the filter unit 22 via an outlet conduit 28 for purified water. In the outlet conduit 28 are disposed a pressure relief valve 30, a non-return valve 32 and a pressure equalizing valve 34 according to the invention on which is mounted a sensor in the form of a first pressure switch 36. The outlet conduit 28 opens into a tap 38 provided with a valve 40 by means of which the outlet conduit 28 opens or closes.

The water purifier 10 according to the inventional so comprises a return conduit 42 which starts at the filter unit 22 and opens into the inlet conduit 12 ahead of the high-pressure pump 18. Another sensor in the form of a second pressure switch 44 is connected to the return conduit 42, said second pressure switch 44 sensing the pressure in the conduit 42 not becoming too low. Because the return conduit 42 communicates with the inlet conduit 12 a considerable pressure drop in the return conduit 42 would indicate that e.g. the pre-filter 16 might be clogged to a certain extent. Other causes for the pressure drop might be that the strainer of the first solenoid valve 14 has been clogged or that the incoming pressure from the water mains is too low. Through this return conduit 42 unpurified water flows from the filter unit 22 said water passing the pressure regulating valve 30 before reaching the inlet conduit 12.

From the filter unit 22 also a reject conduit 46 extends, through which concentrated unpurified water is discharged. In the reject conduit 46 a second solenoid valve 48 is provided which always, via an associated constant flow valve (not shown) allows a constant flow to pass said solenoid valve 48. During flushing of the filter unit 22 of the water purifier 10 the second solenoid valve 48 is fully open.

Figure 2:
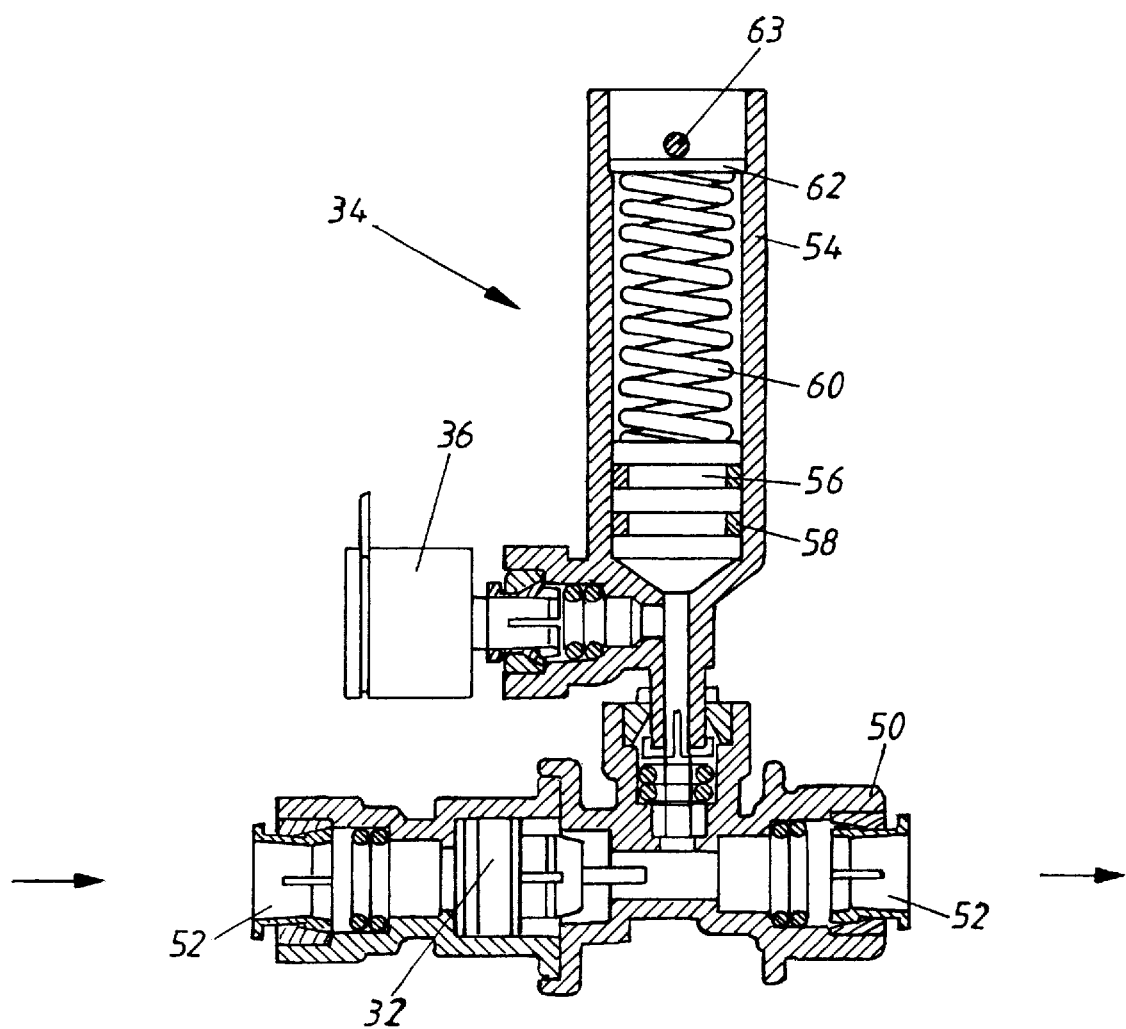
FIG. 2 shows a section through the pressure equalizing valve according to the invention.

From FIG. 2 it appears in detail that the non-return valve 32 is disposed in a first housing 50, joints 52 being provided at both ends of the housing 50 for connecting of the non-return valve 32 to the outlet conduit 28. The pressure relief valve 34 comprises a second housing 54 with pressure equalizing means including a piston 56, having O-rings 58, and a spring 60, one end of which bears on the piston 56 whereas the other end bears on a lock washer 62 in turn bearing on a locking pin 63. The first housing 50 and the second housing 54 communicate with each other. In a preferred embodiment of the invention the second housing 54 is open at the end where the lock washer 62/locking pin 63 are situated. In addition, the pressure equalizing valve 34 comprises a pressure switch 36 starting the high-pressure pump 18 when the pressure in the outlet conduit 28, between the non-return valve 32 and the tap 38, has dropped below a predetermined level.

The water purifier 10 described above operates in the following way. When the tap valve 40 is opened the pressure in the outlet conduit 28 drops between the non-return valve 32 and the tap valve 38 and the high-pressure pump 18 starts and the first solenoid valve 14 is opened via the first pressure switch 36, whereby water is supplied under a certain pressure via the inlet conduit 12. The water passes through the pre-filter 16 and is then mixed with water from the return conduit 42. The water mixture is then sucked into the high-pressure pump 18 and further into the filter unit 22 in which a large water volume is circulated by means of the circulation pump 20. The water that has been purified in the filter unit 22 is discharged via the outlet conduit 28 and passes the pressure regulating valve 30 the purpose of which is to regulate the pressure in the filter unit 22. At low pressure in the outlet conduit 28 the pressure regulating valve 30 is displaced downwards in FIG. 1 causing an increase of the pressure in the filter unit 22 resulting in a rise in the pressure in the part of the return conduit connecting to the filter unit 22. On the other hand, when the pressure in the outlet conduit 28 increases (the tap valve 40 is closing) the pressure regulating valve 30 is displaced upwards in FIG. 1 and the pressure in the filter unit 22 decreases.

When water is being supplied via the inlet conduit 12 also a certain amount of concentrated unpurified water is discharged through the reject conduit 46.

As mentioned above, when the tap valve 40 is closed the pressure in the outlet conduit 28 increases between the non-return valve 32 and the tap 38 and, normally, the pressure increases to about 5 bars when the first pressure switch 36 disconnects the high-pressure pump 18. At this relatively high pressure in the outlet conduit 28 the piston 56 in the pressure equalizing valve 34 will be displaced upwards in FIG. 2, against the action of the spring 60, to take a position of equilibrium. If now there is a leakage in the system, through e.g. the non-return valve 32, the tap 38 or joints, the pressure equalizing valve 34 will strive to maintain the pressure in the outlet conduit 28 by allowing the piston 56 to be displaced downwards in FIG. 2 by the action of the spring 60 until a new position of equilibrium for the piston 56 has been achieved. As time goes on the piston 56 will bottom, i.e. it cannot be further displaced downwards in FIG. 2. However, the pressure equalizing valve 34 results in that the pressure in the outlet conduit 28 between the non-return valve 32 and the tap 38 can be stopped from dropping below a certain level, normally about 0,5 bars, for a considerably longer period of time as compared to a system not including such pressure equalizing valve 34. In principal, it can be said that the pressure equalizing valve 34 has the same function as a softer, more flexible outlet conduit 28.

Preferably, the space above the piston 56 in FIG. 2 is open resulting in that water possibly leaking past the O-rings 58 of the piston 56 can freely be discharged or evaporate, i.e. no service activity will be needed for the removal of the water.

Figure 3:
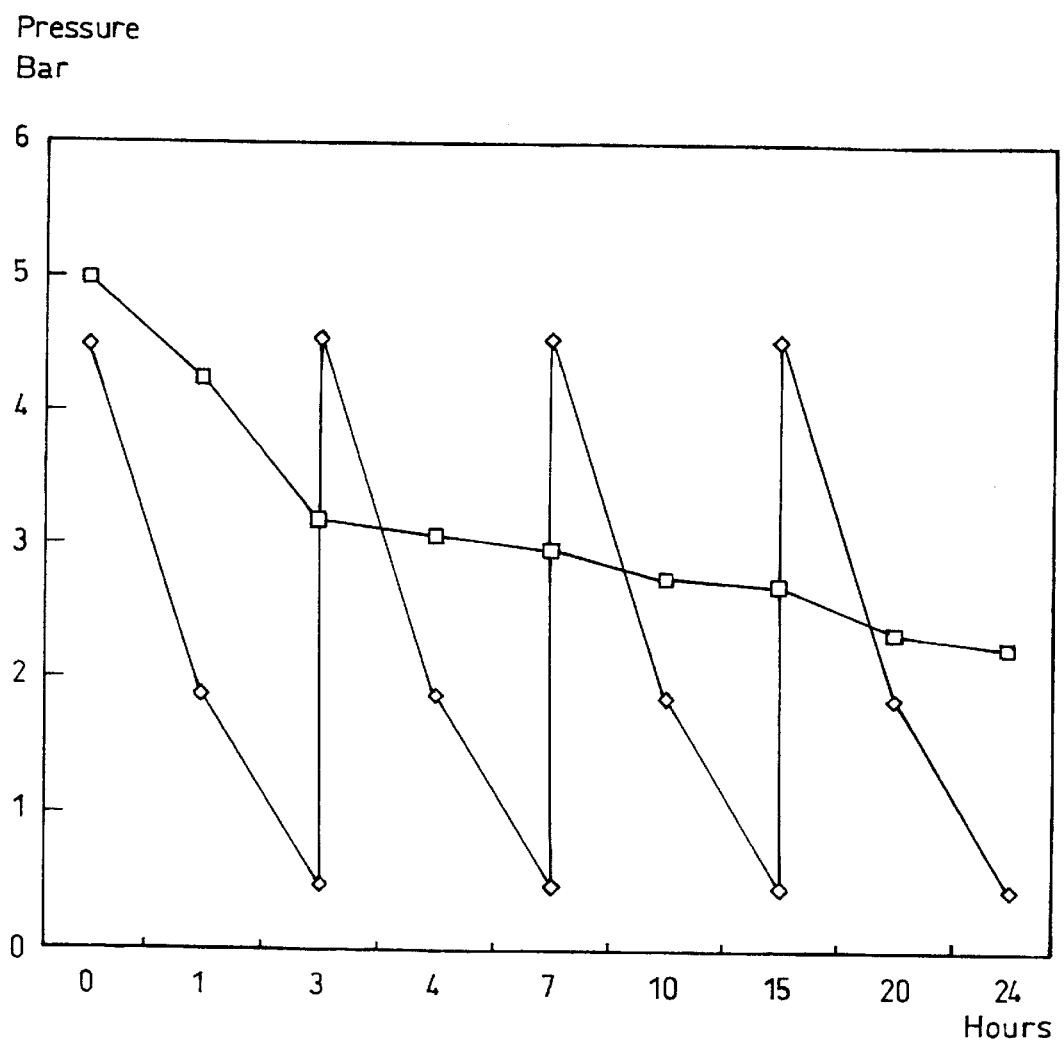
FIG. 3 shows a diagram of a comparative leakage test of a water purifier with a pressure equalizing valve of the invention and a water purifier without such valve.

In FIG. 3 a diagram is shown on a leakage test made on a water purifier 10 provided with a pressure equalizing valve 34 according to the invention and on a similar water purifier without such pressure equalizing valve. As appears from the diagram of FIG. 3, wherein the pressure in the conduit 28 between the non-return valve 32 and the tap 38 has been indicated as a function of time, in use of a pressure equalizing valve according to the invention a pressure is maintained above 0.5 bars for a substantially longer period of time in the outlet conduit 28 than in the case no pressure equalizing valve is being used. From the diagram it can be seen that in a water purifier provided with a pressure equalizing valve according to the invention the pressure in the outlet conduit kan be maintained, for 24 hours, above the level (e.g. 0.5 bars) at which the high-pressure pump 18 starts. As, for hygienic reasons, it is common to flush clean the water purifier every 12 hours the margin is satisfactory.

In a water purifier without any pressure equalizing valve, see FIG. 3, the pressure in the outlet conduit will drop below the level referred to (e.g. 0.5 bars) already after about three hours. The machine will then make a false start, the high-pressure pump 18 starts and the pressure in the outlet conduit 28, between the non-return valve 32 and the tap 38, will again rise to about 5 bars. After about another two hours the pressure in the outlet conduit 28 has dropped to such a low level that again a false start takes place. Then, the high-pressure pump 18 will again build up the pressure in the outlet conduit 28. As shown in the diagram of FIG. 3, this process is repeated cyclically with an interval of about two hours. This can be felt extremely annoying, especially in case there are repeated false starts at night.

Another advantage with the pressure equalizing valve 34 according to the invention is the cooperation between the pressure equalizing valve 34 and the pressure regulating valve 30. As described above, the pressure regulating valve 30 lowers the pressure in the filter unit 22 upon rise in the pressure in the outlet conduit 28 (closing of tap 40). However, the pressure in the outlet conduit 28 increases at an extremely high rate if the tap valve is being closed in a very short time resulting in that the pressure regulating valve 30 cannot lower the pressure in the filter unit 22 in a sufficiently short time and the pressure in the filter unit 22 will rapidly rise causing a pressure shock to develop in the reject conduit 46 prior to the opening of the second solenoid valve 48.

The provision of the pressure equalizing valve 34 results in that the increase of the pressure in the outlet conduit 28 will be less rapid so that the pressure regulating valve 30 will have sufficient time for reducing the pressure in the filter unit 22. Accordingly, the lifetime of the components included, in particular the second solenoid valve 48, will increase.

What is claimed is:

1. Water purifier (10) comprising an inlet conduit (12) with a high-pressure pump (18), a purifying unit (22) including a filter or a membrane, an outlet conduit (28) for purified water, a sensor (36) provided in said outlet conduit (28) for the control of the high-pressure pump (18), a tap point (38) at which the outlet conduit (28) opens, a non-return valve (32) provided in the outlet conduit (28), and a reject conduit (42) for concentrated, unpurified water, wherein in the outlet conduit (28) for purified water, between the non-return valve (32) and the tap point (38), there is provided a pressure accumulator (34), wherein the pressure accumulator (34) comprises a housing (54) in which pressure accumulating means (56,58,60,62,63) are provided, the pressure accumulating means comprising a piston (56) provided with O-rings (58), the displacement of the piston (56) in said housing (54) being controlled by a resilient means (60), and wherein an end of the housing (54) turned away from the piston is open.

2. Water purifier according to claim 1, wherein the resilient means is a compression spring (60) and the end of the spring (60) which is turned away from the piston (56) bears on a lock washer (62) which in turn bears on a locking pin (63).

3. Water purifier (10) comprising an inlet conduit (12) with a high-pressure pump (18), a purifying unit (22) including a filter or a membrane, an outlet conduit (28) for purified water, a sensor (36) provided in said outlet conduit (28) for the control of the high-pressure pump (18), a top point (38) at which the outlet conduit (28) opens, a non-return valve (32) provided in the outlet conduit (28), and a reject conduit (42) for concentrated, unpurified water, wherein in the outlet conduit (28) for purified water, between the non-return valve (32) and the tap point (38), there is provided a pressure accumulator (34), wherein the pressure accumulator (34) comprises a housing (54) in which pressure accumulating means (56,58,60,62,63) are provided, and wherein the pressure accumulator (34) comprises a sensor in the form of a pressure switch (36) which controls the high-pressure pump (18).

4. Water purifier (10) comprising an inlet conduit (12) with a high-pressure pump (18), a purifying unit (22)

including a filter or a membrane, an outlet conduit (28) for purified water, a sensor (36) provided in said outlet conduit (28) for the control of the high-pressure pump (18), a tap point (38) at which the outlet conduit (28) opens, a non-return valve (32) provided in the outlet conduit (28), and a reject conduit (42) for concentrated, unpurified water, wherein in the outlet conduit (28) for purified water, between the non-return valve (32) and the tap point (38), there is provided a pressure accumulator (34), wherein the pressure accumulator (34) comprises a housing (54) in which pressure accumulating means (56,58,60,62,63) are provided, and wherein a pressure regulating valve (30) is provided in the outlet conduit (28) between the filter unit (22) and the non-return valve (32).

* * * * *